United States Patent
Gao et al.

(10) Patent No.: US 11,050,711 B2
(45) Date of Patent: Jun. 29, 2021

(54) SEMANTIC VALIDATION METHOD AND APPARATUS

(71) Applicant: Huawei Technologies Co., Ltd., Shenzhen (CN)

(72) Inventors: Ying Gao, Nanjing (CN); Yongjing Zhang, Nanjing (CN); Jiaxin Yin, Nanjing (CN); Jiaming Wu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 208 days.

(21) Appl. No.: 16/012,421

(22) Filed: Jun. 19, 2018

(65) Prior Publication Data
US 2018/0300403 A1   Oct. 18, 2018

Related U.S. Application Data

(63) Continuation of application No. PCT/CN2016/111102, filed on Dec. 20, 2016.

(30) Foreign Application Priority Data

Dec. 25, 2015   (CN) .......................... 201510998415.7

(51) Int. Cl.
*H04L 29/12*   (2006.01)
*G06F 16/36*   (2019.01)
(Continued)

(52) U.S. Cl.
CPC ........ *H04L 61/3015* (2013.01); *G06F 16/367* (2019.01); *H04L 61/306* (2013.01);
(Continued)

(58) Field of Classification Search
None
See application file for complete search history.

(56) References Cited

U.S. PATENT DOCUMENTS

2007/0226246 A1\*   9/2007   Dheap ..................... G06F 16/86
2009/0177777 A1\*   7/2009   Behrendt ............. G06F 16/367
                                                                  709/226
(Continued)

FOREIGN PATENT DOCUMENTS

CN   102136933 A   7/2011
CN   102542513 A   7/2012
(Continued)

OTHER PUBLICATIONS

Nowshade Kabir, "A Semantic Knowledge Management System Framework for Knowledge Integration from Mobile Devices", 7th European Conference on Intellectual Capital 2015, Academia.edu. 12 pages.\*

(Continued)

*Primary Examiner* — Uyen T Le
(74) *Attorney, Agent, or Firm* — Conley Rose, P.C.

(57) ABSTRACT

A semantic validation method, applied to a Machine-to-Machine Communications (M2M) system, where the method includes receiving, by an apparatus storing a semantic description resource, an operation request related to a first semantic description resource, including semantic information of the first semantic description resource, an association relationship between the first semantic description resource and another semantic description resource, and a uniform resource identifier (URI) of an ontology referenced by the first semantic description resource, determining that the first semantic description resource is associated with the semantic description resource, sending a semantic validation request message to an apparatus that stores the ontology referenced by the first semantic description resource. Hence, accuracy of a resource and data shared between industries and applications using a public capability of the M2M system can be ensured in a case of no priori knowledge.

20 Claims, 7 Drawing Sheets

(51) Int. Cl.
- *H04L 29/08* (2006.01)
- *H04L 29/06* (2006.01)
- *H04W 4/38* (2018.01)
- *H04W 12/06* (2021.01)
- *H04W 4/70* (2018.01)
- *H04W 8/26* (2009.01)
- *H04W 88/16* (2009.01)

(52) U.S. Cl.
CPC ............. *H04L 63/08* (2013.01); *H04L 67/12* (2013.01); *H04L 67/16* (2013.01); *H04W 4/38* (2018.02); *H04W 4/70* (2018.02); *H04W 8/26* (2013.01); *H04W 12/06* (2013.01); *H04W 88/16* (2013.01)

(56) References Cited

U.S. PATENT DOCUMENTS

| | | |
|---|---|---|
| 2009/0265378 A1 | 10/2009 | Dahl et al. |
| 2010/0185700 A1 | 7/2010 | Bodain |
| 2010/0281061 A1 | 11/2010 | Chen |
| 2011/0087685 A1 | 4/2011 | Lin et al. |
| 2011/0128911 A1 | 6/2011 | Shaheen |
| 2011/0213871 A1* | 9/2011 | DiGirolamo ............ H04L 67/12 709/223 |
| 2013/0030827 A1* | 1/2013 | Snyder ................... G06F 19/324 705/2 |
| 2013/0219064 A1 | 8/2013 | Zhang et al. |
| 2014/0089478 A1* | 3/2014 | Seed ................... H04L 41/0273 709/222 |
| 2014/0215043 A1* | 7/2014 | Ryu ...................... G06F 16/955 709/223 |
| 2015/0074144 A1 | 3/2015 | Zhang et al. |
| 2015/0227618 A1 | 8/2015 | Dong et al. |
| 2016/0019294 A1* | 1/2016 | Dong .................... G06F 16/288 707/794 |
| 2016/0191295 A1* | 6/2016 | Dong ...................... G06F 16/95 707/741 |
| 2016/0302069 A1* | 10/2016 | Kim ...................... H04L 63/101 |
| 2018/0089281 A1* | 3/2018 | Li ........................ G06F 16/2471 |
| 2018/0203907 A1* | 7/2018 | Bauer ............... G06F 16/24549 |

FOREIGN PATENT DOCUMENTS

| | | |
|---|---|---|
| CN | 102668493 A | 9/2012 |
| CN | 103593335 A | 2/2014 |
| CN | 103596117 A | 2/2014 |
| KR | 20100048122 A | 5/2010 |
| KR | 20120100905 A | 9/2012 |
| WO | 2015119901 A1 | 8/2015 |

OTHER PUBLICATIONS

Kovacs et al, "Standards-Based Worldwide Semantic Interoperability for IoT", IEEE Communications Magazine—Communications Standards Supplement, Dec. 2016, pp. 40-46.*

Foreign Communication From a Counterpart Application, European Application No. 16877713.4, Extended European Search Report dated Nov. 26, 2018, 15 pages.

Machine Translation and Abstract of Chinese Publication No. CN102542513, Jul. 4, 2012, 10 pages.

Machine Translation and Abstract of Chinese Publication No. CN103593335, Feb. 19, 2014, 16 pages.

Foreign Communication From a Counterpart Application, PCT Application No. PCT/CN2016/111102, English Translation of International Search Report dated Mar. 31, 2017, 2 pages.

Foreign Communication From a Counterpart Application, PCT Application No. PCT/CN2016/111102, English Translation of Written Opinion dated Mar. 31, 2017, 6 pages.

Foreign Communication From a Counterpart Application, Chinese Application No. 201510998415.7, Chinese Office Action dated Aug. 20, 2019, 11 pages.

Foreign Communication From a Counterpart Application, Chinese Application No. 201510998415.7, Chinese Notice of Allowance dated Aug. 13, 2019, 3 pages.

\* cited by examiner

SEMANTIC VALIDATION METHOD AND APPARATUS

CROSS-REFERENCE TO RELATED APPLICATIONS

This application is a continuation of International Patent Application No. PCT/CN2016/111102 filed on Dec. 20, 2016, which claims priority to Chinese Patent Application No. 201510998415.7 filed on Dec. 25, 2015. The disclosures of the aforementioned applications are hereby incorporated by reference in their entireties.

TECHNICAL FIELD

The present disclosure relates to the field of Machine-to-Machine Communications (M2M) technologies, and in particular, to a semantic validation method and apparatus.

BACKGROUND

M2M is a network-based application and service that use intelligent interaction between machines as a core. Based on the M2M technology, a wireless or wired communications module and application processing logic are embedded into a machine to implement data communication without human intervention to satisfy informatization requirements of users on aspects such as monitoring, commanding and dispatching, data collection, and measurement. Currently, the M2M technology has been applied to an increasing quantity of industries and fields, for example, industries such as intelligent transportation, agricultural irrigation, smart household, power grid, and meter reading. To satisfy requirements of application services in different industries, an M2M system operator develops a unified M2M platform to implement some public capabilities, for example, data access and storage, data sharing and transmission, group communication, data subscription notification, security, charging, and resource discovery. The M2M platform may access different types of devices and sensors, and may provide an application access interface to allow applications in different industries to invoke, using the access interface, the public capabilities provided by the M2M platform.

Currently, the M2M system provides a public capability component (such as a common service entity (CSE)), and provides a unified interface to perform data transmission to shield a difference between device communication manners such that industries and applications that access the M2M system share a data transmission capability. However, for data use, the industries and applications are still closed to each other. For example, for a device belonging to different applications, in a case of no priori knowledge, another application cannot know a function of the device and an operation that can be performed by the device, and even if another application can obtain data, the other application cannot understand a meaning of the data. Consequently, data reuse and sharing between different applications cannot be implemented, hindering formation of an open data market.

To enable the industries and applications to share a resource and data in the case of no priori knowledge, a semantic description resource is added to the M2M system such that data and an operation can be described in a machine-understandable manner, to enable another application to determine, using semantic description information, a function and an executable operation that are provided by a parent resource, and to determine a data meaning, such as a data type or a unit, provided by the parent resource, thereby implementing data sharing between the different applications and helping to form the open data market. In the future, a semantic function such as semantic query or semantic reasoning may be further provided using semantic description information in the semantic description resource.

However, based on an existing M2M architecture, validation on the semantic description resource cannot be implemented, and accuracy of semantic description information in the semantic description resource cannot be ensured. For example, consistency between the semantic description information and an ontology indicated by an ontology reference attribute cannot be ensured. Consequently, result accuracy and implementation of the function such as semantic query or semantic reasoning are affected.

SUMMARY

The present disclosure provides a method and an apparatus for implementing semantic validation, to resolve a problem that in an M2M architecture, validation on semantic description information cannot be implemented, and accuracy of semantic description information in a semantic description resource cannot be ensured, affecting result accuracy and a function such as semantic query or semantic reasoning that may be further provided by a public capability of an M2M system.

During specific implementation, a gateway in the M2M system may serve as an apparatus that stores a semantic description resource, and an M2M platform may serve as an apparatus that stores an ontology referenced by the semantic description resource. Further, the M2M gateway receives an operation request that is sent by an application server and that is related to the semantic description resource. Then, the M2M gateway determines an entity for performing semantic validation (such as the M2M gateway or platform) based on content of the operation request, and triggers the entity for performing semantic validation to perform, using the ontology that is referenced by the semantic description resource and that is stored on the platform, semantic validation on the semantic description resource stored on the gateway. According to the present disclosure, the semantic validation may be applied to the M2M system, to ensure accuracy of a resource and data that are shared between industries and applications that use the public capability of the M2M system in a case of no priori knowledge.

According to a first aspect, an embodiment of the present disclosure provides a semantic validation method, where the method is applied to an M2M system. An apparatus (such as an M2M gateway) that stores a semantic description resource receives an operation request related to a first semantic description resource, where the operation request related to the first semantic description resource includes semantic information of the first semantic description resource, an association relationship between the first semantic description resource and another semantic description resource, and a uniform resource identifier (URI) of an ontology referenced by the first semantic description resource. Then, the apparatus that stores the semantic description resource determines, based on the association relationship between the first semantic description resource and the other semantic description resource, that the first semantic description resource is associated with the semantic description resource, and then sends a semantic validation request message to an apparatus that stores the ontology referenced by the first semantic description resource. The semantic validation request message is used for instructing to use the ontology indicated by the URI of the ontology referenced by the first semantic description resource and an ontology referenced by the associated semantic description resource indicated by the association relationship to perform semantic validation on the semantic information of the first semantic description resource and semantic information of the associated semantic description resource. According to this embodiment of the present disclosure, the M2M gateway that stores the semantic description resource may trigger to perform the semantic validation on the semantic description resource using the ontology referenced by the semantic description resource stored on an M2M platform. Therefore, another application or industry in the M2M system can learn and share a resource described by a semantic description resource on which semantic validation succeeds.

In a possible design, the apparatus that stores the semantic description resource may further receive a semantic validation success response message returned by the apparatus that stores the ontology referenced by the first semantic description resource, and then perform the operation request related to the first semantic description resource, and set, in the first semantic description resource, a parameter indicating that the semantic validation succeeds. Alternatively, the apparatus that stores the semantic description resource may further receive a response message that indicates that no semantic validation is performed and that is returned by the apparatus that stores the ontology referenced by the first semantic description resource, and then perform the operation request related to the first semantic description resource, and set, in the first semantic description resource, a parameter indicating that no semantic validation is performed. The parameter indicating that the semantic validation succeeds or the parameter indicating that no semantic validation is performed is added to the semantic description resource such that an application server or another apparatus that subsequently obtains or accesses the semantic description resource can clearly determine whether the semantic validation has been performed, and whether a resource described by the semantic description resource can be learned and referenced.

In a possible design, the apparatus that stores the semantic description resource may determine, by determining that the semantic description resource includes an association attribute indicating an association relationship between the semantic description resource and another semantic description resource or that the description attribute of the semantic description resource includes triplet information indicating an association relationship between the semantic description resource and another semantic description resource, that the semantic description resource is associated with the other semantic description resource. Alternatively, the apparatus that stores the semantic description resource may determine, by determining that the semantic description resource does not include an association attribute indicating an association relationship between the semantic description resource and another semantic description resource and the description attribute of the semantic description resource does not include triplet information indicating an association relationship between the semantic description resource and another semantic description resource, that the semantic description resource is not associated with the other semantic description resource. Therefore, the apparatus that stores the semantic description resource may more accurately and effectively determine whether the description resource is associated with the other semantic description resource, and the apparatus that stores the semantic description resource does not need to analyze the entire semantic description resource.

In possible design, the apparatus that stores the semantic description resource may further receive an operation request related to a second semantic description resource, where the operation request related to the second semantic description resource includes semantic information of the second semantic description resource, and a URI of an ontology referenced by the second semantic description resource. Then, the apparatus that stores the semantic description resource determines that the second semantic description resource is not associated with another semantic description resource, obtains, from an apparatus that stores the ontology referenced by the second semantic description resource, the ontology referenced by the second semantic description resource, and finally performs validation on the semantic information of the second semantic description resource using the ontology referenced by the second semantic description resource. Therefore, according to the apparatus that stores the semantic description resource, the ontology referenced by the semantic description resource not associated with the other semantic description resource may be obtained from the apparatus that stores the ontology, and then the semantic validation may be performed. Therefore, the platform does not need to perform the semantic validation, thereby reducing works of the platform.

In a possible design, the apparatus that stores the semantic description resource may further receive a semantic description resource obtaining request, and determine that a to-be-obtained semantic description resource includes the parameter indicating that no semantic validation is performed. Then, a semantic validation procedure is triggered, and the semantic description resource is returned after the semantic validation succeeds. Based on the semantic validation on the semantic description resource that includes the parameter indicating that no semantic validation is performed, it is ensured that all semantic description resources sent to another application server are semantic description resources that are successfully validated. Therefore, the other application server can share and learn the semantic description resources.

In another possible design, the apparatus that stores the semantic description resource may further receive an operation request related to a third semantic description resource, and determine that the third semantic description resource is not associated with another semantic description resource. However, an ontology referenced by the third semantic description resource is not obtained from an apparatus that stores the ontology referenced by the third semantic description resource. The operation request related to the third semantic description resource may be further performed first, and then a parameter indicating that no semantic validation is performed may be set in the third semantic description resource. The parameter indicating that no semantic validation is performed is set such that an application server or another apparatus that subsequently obtains or accesses the semantic description resource can clearly determine whether the semantic validation has been performed, and whether a resource described by the semantic description resource can be learned and referenced.

In another possible design, the apparatus that stores the semantic description resource may further receive a semantic description resource obtaining request, where the obtaining request carries a URI of a to-be-obtained semantic description resource and an identifier indicating semantic validation, and then, determine, based on the URI of the to-be-obtained semantic description, that the to-be-obtained semantic description resource includes the parameter indicating that no semantic validation is performed. Then, the apparatus that stores the semantic description resource triggers, based on a determining result to perform semantic validation on semantic information of the to-be-obtained semantic description resource, and after determining that the validation on the semantic information of the to-be-obtained semantic description resource succeeds, sends the to-be-obtained semantic description resource to an apparatus that sends the obtaining request. In this design, before sending the semantic description resource, the apparatus that stores the semantic description resource triggers to perform semantic validation again on the semantic description resource on which no semantic validation is performed, and sends the semantic description resource to the apparatus that sends the obtaining request after the semantic validation succeeds to ensure that the semantic validation on the obtained semantic description resource succeeds.

In another possible design, after determining that the validation on semantic information of the to-be-obtained semantic description resource succeeds, the apparatus that stores the semantic description resource further updates the parameter that indicates that no semantic validation is performed and that is included in the to-be-obtained semantic description resource to a parameter indicating that the semantic validation succeeds. Therefore, when an apparatus needs to obtain a semantic description resource next time, the semantic description resource may be directly sent without triggering semantic validation again.

According to a second aspect, an embodiment of the present disclosure provides a computer storage medium configured to store a computer software instruction used by the foregoing apparatus that stores the semantic description resource. The computer storage medium includes a program designed for performing the foregoing aspect.

According to a third aspect, an embodiment of the present disclosure provides an apparatus that stores the semantic description resource. The apparatus that stores the semantic description resource has a function of implementing a behavior of the apparatus for storing the semantic description resource in the foregoing method. The function may be implemented by hardware, or may be implemented by hardware executing corresponding software. The hardware or software includes one or more units corresponding to the foregoing function.

According to a fourth aspect, a structure of an apparatus that stores a semantic description resource includes a memory, a transceiver, and a processor. The memory is configured to store computer executable program code, and is coupled to a transceiver. The program code includes an instruction. When the processor executes the instruction, the instruction enables the apparatus to execute information or an instruction provided in the foregoing method.

According to a fifth aspect, an embodiment of the present disclosure provides a semantic validation method, where the method is applied to an M2M system. An apparatus (such as an M2M platform) that stores an ontology referenced by a semantic description resource receives a semantic validation request message sent by an apparatus that stores a semantic description resource, where the semantic validation request message includes semantic information of a first semantic description resource, a URI of an ontology referenced by the first semantic description resource, and an association relationship between the first semantic description resource and another semantic description resource. The apparatus that stores the ontology referenced by the semantic description resource obtains, based on the association relationship between the first semantic description resource and the other semantic description resource, semantic information of the associated another semantic description resource and a URI of an ontology referenced by the associated semantic description resource. Finally, the apparatus that stores the ontology referenced by the semantic description resource performs semantic validation on the semantic information of the first semantic description resource and the semantic information of the associated semantic description resource using the ontology indicated by the URI of the ontology referenced by the first semantic description resource and the ontology indicated by the URI of the ontology referenced by the associated semantic description resource. According to this embodiment of the present disclosure, the apparatus (such as the M2M platform) that stores the ontology referenced by the semantic description resource may perform, using the stored ontology, the semantic validation on the semantic description resource stored on an M2M gateway. Therefore, another application or industry in the M2M system can learn and share a resource described by a semantic description resource on which semantic validation succeeds.

In a possible design, after the semantic validation succeeds, the apparatus (such as the M2M platform) that stores the ontology referenced by the semantic description resource returns a semantic validation success response message to the apparatus (such as the M2M gateway) that stores the semantic description resource, where the semantic validation success response message is used for instructing to set, for the first semantic description resource, a parameter indicating that the semantic validation succeeds, or when the semantic information of the associated another semantic description resource and the URI of the ontology referenced by the associated semantic description resource are not obtained, returns a response message indicating that no semantic validation is performed to the apparatus (such as the M2M gateway) that stores the semantic description resource, where the response message indicating that no semantic validation is performed is used for instructing to set, for the first semantic description resource, a parameter indicating that no semantic validation is performed. The parameter indicating that the semantic validation succeeds or the parameter indicating that no semantic validation is performed is added to the response message such that the M2M gateway confirms a semantic validation result, and an application server or another apparatus that subsequently obtains or accesses the semantic description resource can clearly determine whether the semantic validation has been performed.

In a possible design, the apparatus (such as the M2M platform) that stores the ontology referenced by the semantic description resource may further receive an ontology obtaining request sent by the apparatus that stores the semantic description resource, where the ontology obtaining request carries a URI of an ontology, where the ontology indicated by the URI of the ontology is used for validating semantic information of the semantic description resource stored in the apparatus that stores the semantic description resource, and then the apparatus (such as the M2M platform) that stores the ontology referenced by the semantic description resource returns the ontology indicated by the URI of the ontology to the apparatus (such as the M2M gateway) that stores the semantic description resource. Therefore, the apparatus that stores the semantic description resource can perform, using the obtained ontology, the semantic validation on the semantic description resource stored by the apparatus that stores the semantic description resource. Therefore, the semantic validation becomes more flexible.

According to a sixth aspect, an embodiment of the present disclosure provides a computer storage medium configured to store a computer software instruction used by the foregoing apparatus that stores the ontology referenced by the semantic description resource. The computer storage medium includes a program designed for performing the foregoing aspect.

According to a seventh aspect, an embodiment of the present disclosure provides an apparatus that stores an ontology referenced by a semantic description resource. The apparatus that stores the ontology referenced by the semantic description resource has a function of implementing a behavior of the apparatus that stores the ontology referenced by the semantic description resource in the foregoing method. The function may be implemented by hardware, or may be implemented by hardware executing corresponding software. The hardware or software includes one or more units corresponding to the foregoing function.

According to an eighth aspect, a structure of an apparatus that stores an ontology referenced by a semantic description resource includes a memory, a transceiver, and a processor. The memory is configured to store computer executable program code, and is coupled to the transceiver. The program code includes an instruction. When the processor executes the instruction, the instruction enables the apparatus to execute information or an instruction provided in the foregoing method.

It can be learned from the foregoing solutions that, in the embodiments of the present disclosure, the M2M gateway determines an entity for performing semantic validation (such as the M2M gateway or platform) based on content of the operation request, and triggers the entity for performing semantic validation to perform, using the ontology that is referenced by the semantic description resource and that is stored on the platform, the semantic validation on the semantic description resource stored on the gateway. According to the present disclosure, the semantic validation may be applied to the M2M system to ensure accuracy of a resource and data that are shared between industries and applications that use a public capability of the M2M system in a case of no priori knowledge.

BRIEF DESCRIPTION OF DRAWINGS

To describe the technical solutions in the embodiments of the present disclosure more clearly, the following briefly describes the accompanying drawings required for describing the embodiments. The accompanying drawings in the following description merely show some embodiments of the present disclosure, and persons of ordinary skill in the art can derive other implementations from these accompanying drawings without creative efforts. All these embodiments or implementations shall fall within the protection scope of the present disclosure.

DESCRIPTION OF EMBODIMENTS

The technical solutions according to embodiments of the present disclosure are clearly described in the following with reference to the accompanying drawings. The described embodiments are merely some but not all of the embodiments of the present disclosure. All other embodiments obtained by persons of ordinary skill in the art based on the embodiments of the present disclosure without creative efforts shall fall within the protection scope of the present disclosure.

A network architecture and a service scenario that are described in the embodiments of the present disclosure are intended to describe the technical solutions in the embodiments of the present disclosure more clearly, and do not constitute any limitation to the technical solutions provided in the embodiments of the present disclosure. Persons of ordinary skill in the art may know that with evolution of network architectures and appearance of new service scenarios, the technical solutions provided in the embodiments of the present disclosure are also applicable to similar technical problems.

Figure 1A:
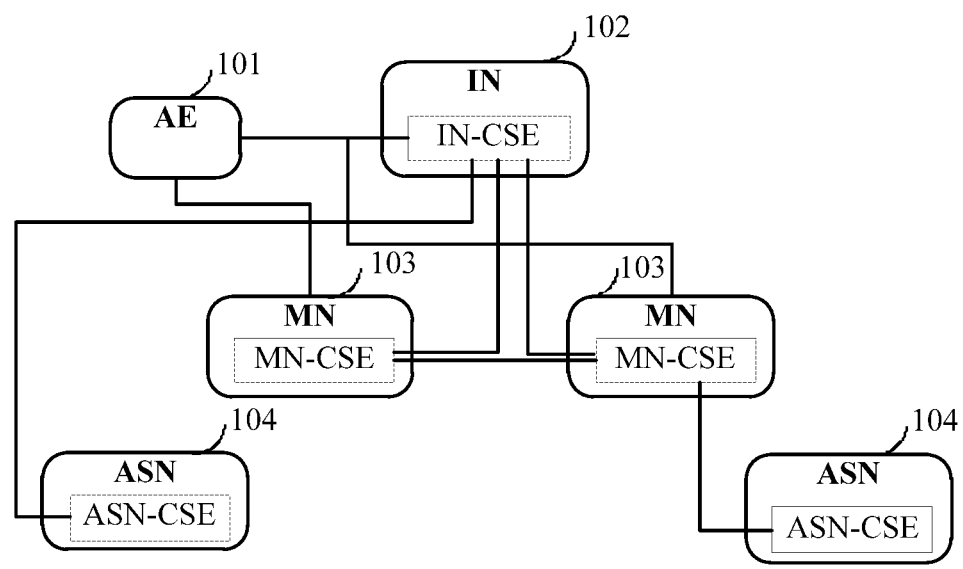
FIG. 1A is an M2M system-based network architectural diagram according to an embodiment of the present disclosure.

FIG. 1A provides a schematic architectural diagram of an M2M system according to an embodiment of the present disclosure, for validating semantic description information in the M2M system. This embodiment of the present disclosure is based on an existing M2M architecture, and ontologies of semantic description resources are stored on an M2M platform. The ontologies that are referenced by the semantic description resources and that are stored on the M2M platform are used for performing semantic validation on semantic information of the semantic description resources. Further, the semantic description resources may be stored on the M2M platform, or may be stored on M2M gateways. Therefore, the semantic validation on the semantic description resource provided in this embodiment of the present disclosure may be a validation performed on the semantic description resource by the M2M platform based on the ontology that is referenced by the semantic description resource and that is stored on the M2M platform, or may be a validation performed, by the M2M gateway by obtaining, from the M2M platform, the ontology that is referenced by the semantic description resource and that is stored on the M2M platform, on the semantic description resource stored on the M2M gateway. An ontology is a formalized and clear description about a sharing concept model, and the ontology is used for performing semantic validation on semantic information of a semantic description resource. The semantic information is information that describes a resource that is described by the semantic description resource. The semantic information in this embodiment of the present disclosure may exist in a triplet form, and is used for describing a resource that is described by a semantic description resource (for example, the semantic information may be information that is in triplet information in FIG. 3A to FIG. 3D and whose subject is a resource described by a semantic description resource. In another optional implementation, the semantic information may be triplet information in FIG. 3A to FIG. 3D except information about a triplet including an association relationship (for example, a predicate hasResDescriptorLink). It is commonly understood that, the ontology may provide common understanding about knowledge in a field, determine universally recognized words in the field, and provide clear definitions of these words (terms) and a mutual relationship between the words. In this embodiment of the present disclosure, the ontology may be obtained by the M2M platform from an existing ontology library and stored on the M2M platform, or may be configured by the M2M platform in advance.

In this embodiment of the present disclosure, an apparatus that stores a semantic description resource may be each gateway or M2M platform in the M2M system, and an apparatus that stores an ontology referenced by a semantic description resource may be the M2M platform. Correspondingly, this embodiment of the present disclosure may be applied to another system, provided that in the other system, the apparatus that stores the semantic description resource and the apparatus that stores the ontology referenced by the semantic description resource are not a same apparatus.

In addition, first, second, and third in the embodiments of the present disclosure have no technical significance, and are used only for distinguishing between terms.

As shown in FIG. 1A, the M2M system provided in this embodiment of the present disclosure includes an M2M platform 102, an M2M gateway 103, an M2M device 104, and an application server 101. As shown in FIG. 1A, the M2M platform 101 may be an infrastructure node (IN), the M2M gateway 102 is a middle node (MN), and the M2M device 104 may be an application service node (ASN) or an application dedicated node (AND) (not shown). In addition, a CSE serves as a public capability component of the M2M system, and may bear a public capability. The CSE may be included in the M2M platform 102, the M2M gateway 103, or the ASN that serves as the M2M device 104 to implement a corresponding function. The CSE enables, using an Mca reference point, an application entity (AE) to access an open public capability of the CSE, implements, using an Mcc reference point, communication between CSEs, and invokes a bottom-layer network capability using an Mcn reference point.

In the architecture shown in FIG. 1A, the M2M gateway 103 may store a semantic description resource of each resource, and receive an operation request that is related to the semantic description resource and that is sent by each application server. The operation request related to the semantic description resource may be a request for creating a semantic description resource or a request for updating a semantic description resource. The M2M gateway 103 and the M2M platform 102 may further trigger a semantic validation procedure before performing the operation request related to the semantic description resource. The semantic validation procedure may be determining an entity for performing semantic validation (such as the M2M gateway 103 that stores the semantic description resource or the M2M platform 102 that stores the ontology referenced by the semantic description resource), and performing semantic validation by the determined entity for performing semantic validation. The M2M platform 102 further stores the ontology referenced by each semantic description resource, and provides the ontology referenced by the semantic description resource to a semantic validation gateway, or directly performs semantic validation on the semantic description resource using the ontology referenced by the semantic description resource. Further, for the semantic validation procedure, refer to the following detailed description in this embodiment of the present disclosure.

The semantic description resources stored on the M2M gateway 103 and the M2M platform 102 may serve as a form of child resources of existing resources, or may serve as independent resources. A semantic description resource is used for describing semantic information of a related resource. Descriptions of data and an operation of the related resource in a machine-understandable manner enables another application to determine, using the semantic description resource, a function, an executable operation, and a meaning of data such as a data type or a unit, that are provided by the resource described by the semantic description resource, to implement data sharing between different applications, and help to form an open data market.

Figure 1B:
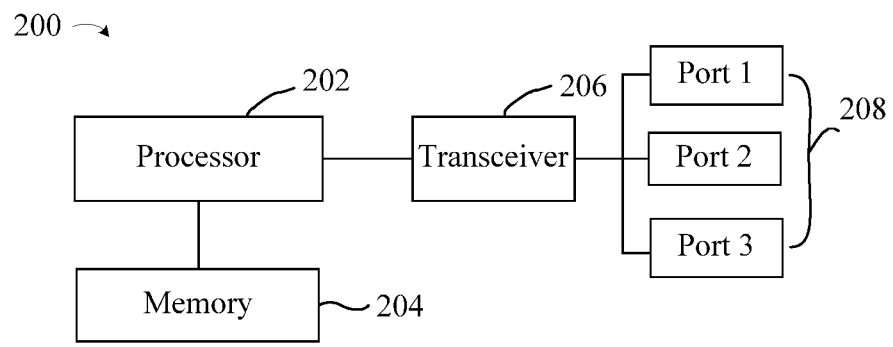
FIG. 1B is a schematic structural diagram of an apparatus that stores a semantic description resource or an apparatus that stores an ontology referenced by a semantic description resource according to an embodiment of the present disclosure.

FIG. 1B is a schematic structural diagram of an apparatus 200 that stores a semantic description resource according to an embodiment of the present disclosure. The apparatus 200 is configured to receive, an operation request related to a semantic description resource, and trigger a semantic description resource validation procedure in the M2M system shown in FIG. 1A. The apparatus 200 may include one or more ports 208 coupled to a transceiver 206. The transceiver 206 may be a transmitter, a receiver, or a combination thereof for sending or receiving a data packet to or from another network node using the port 208. A processor 202 is coupled to the transceiver 206, and is configured to process the data packet. The processor 202 may include one or more multi-core processors and/or a memory 204. The processor 202 may be a general purpose processor, an application-specific integrated circuit (ASIC), or a digital signal processor (DSP).

The memory 204 may be a non-transient storage medium coupled to the processor 202, and is configured to store different types of data, such as a semantic description resource, or a resource described by a semantic description resource. The memory 204 may include a read-only memory (ROM), a random access memory (RAM), or a dynamic storage device of another type that is capable of storing information and an instruction, or may be a magnetic disk storage. The memory 204 may be configured to store an instruction for implementing a method related to semantic validation. It may be understood that an executable instruction is programmed or loaded to at least one of the processor 202 of the apparatus 200, a cache, and a long-term storage.

The apparatus 200 that stores the semantic description resource may execute one or more instructions according to this embodiment of the present disclosure to trigger semantic validation. These instructions may be stored in the memory 204, or may be integrated into a kernel or a plug-in of a kernel of an operating system of the apparatus 200.

In another embodiment, the apparatus 200 serves as the apparatus that stores the semantic description resource, and includes the memory 204, the processor 202, the transceiver 206, and one or more ports 208 coupled to the transceiver 206. The memory 204 is configured to store computer executable program code. The processor 202 is coupled to the memory 204 and the transceiver 206.

The program code includes an instruction. When the processor 204 executes the instruction, the instruction enables the apparatus 200 to perform related steps performed by a gateway in FIG. 6 and FIG. 7.

Figure 2:
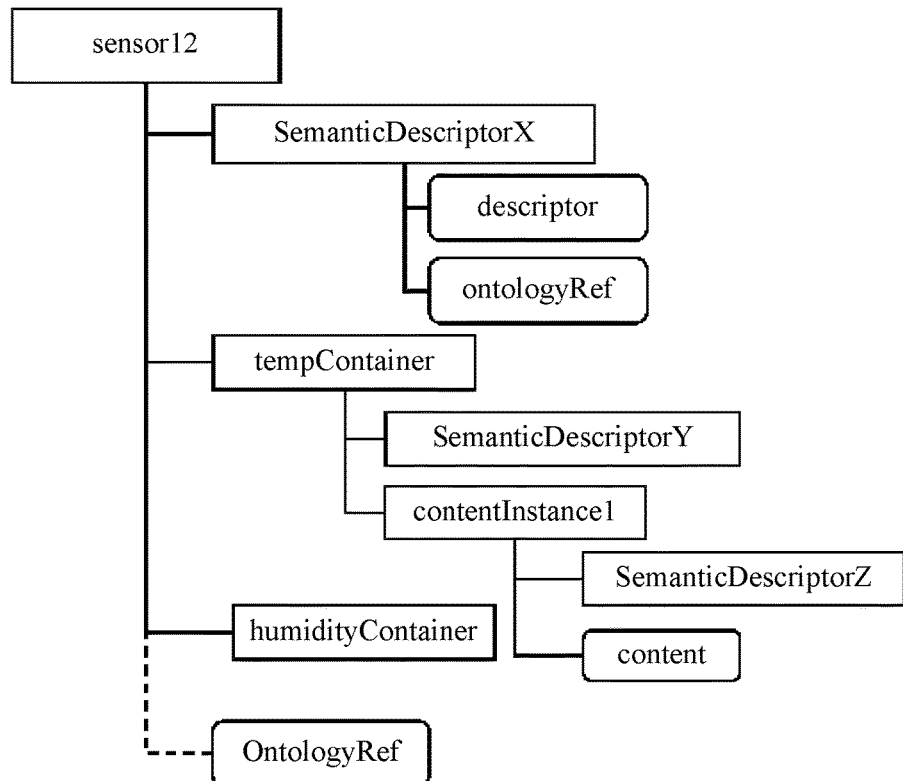
FIG. 2 shows a structure of a semantic description resource serving as a child resource of a resource sensor12 described by the semantic description resource according to an embodiment of the present disclosure.

In addition, FIG. 2 may further be used as a schematic structural diagram of an apparatus that stores an ontology referenced by a semantic description resource according to an embodiment of the present disclosure. As the apparatus that stores the ontology referenced by the semantic description resource, the apparatus in FIG. 2 may include a memory 204, a processor 202, a transceiver 206, and one or more ports 208 coupled to the transceiver 206. The memory 204 is configured to store computer executable program code. The processor 202 is coupled to the memory 204 and the transceiver 206.

The program code includes an instruction. When the processor 202 executes the instruction, the instruction enables the apparatus to perform related steps performed by a platform in FIG. 6 and FIG. 7.

In an example, a structure of a semantic description resource semanticDescriptor stored in the apparatus that stores the semantic description resource in FIG. 1 to FIG. 8 may be shown in FIG. 2, and a semantic description resource semanticDescriptorX used as a child resource of a resource sensor sensor12 is used for describing semantic information related to a resource sensor12. The semantic description resource includes a parameter of a description attribute (descriptor) and a parameter of an ontology (ontologyRef) referenced by the semantic description resource. The descriptor includes semantic information of the semantic description resource and an association relationship between the semantic description resource and another semantic description resource. The ontologyRef includes a URI of the ontology referenced by the semantic description resource. In an optional implementation, the ontologyRef referenced by the semantic description resource may alternatively exist in a form of a dashed line in FIG. 2, and serve as a parameter of an attribute of the resource (sensor12) described by the semantic description resource instead of serving as an attribute parameter of the semantic description resource. This is not limited in this embodiment of the present disclosure. In another optional implementation, the ontologyRef may alternatively be included in the descriptor. In addition, the resource sensor12 further includes two child resources, a temperature container (tempContainer) and a humidity container (humidityContainer). A child resource semanticDescriptorY of the tempContainer is used for describing semantic information related to the resource tempContainer. Further, a child resource semanticDescriptorZ of a child resource contentInstance1 of the tempContainer is used for describing semantic information related to the resource contentInstance1.

Figure 3A:
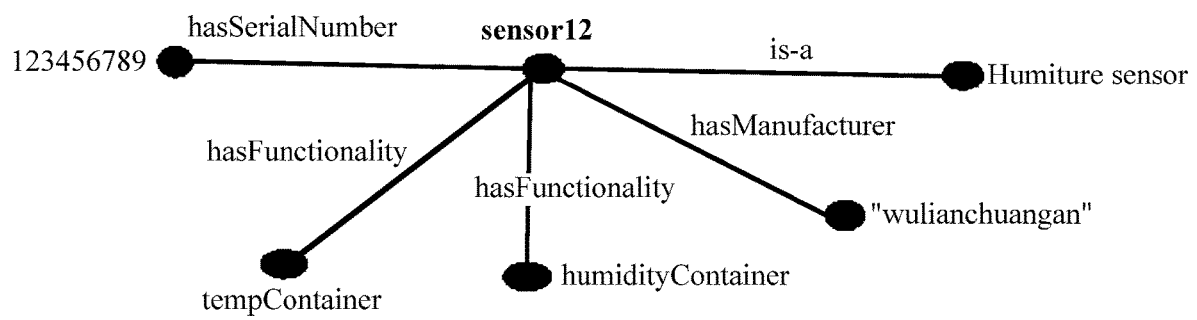
FIG. 3A is a schematic diagram of a triplet that indicates semantic information and that is included in a description attribute parameter of a semantic description resource not associated with another semantic description resource according to an embodiment of the present disclosure.

FIG. 3A is a schematic diagram of a triplet that indicates semantic information and that is included in a description attribute parameter of a semantic description resource not associated with another semantic description resource according to an embodiment of the present disclosure. Further, in FIG. 3A, a parameter of a description attribute (descriptor) of a semantic description resource SemanticDescriptorX that serves as a resource sensor12 includes the following information:

<baont:sensor12>
<rdf: type> Humiture Sensor</rdf: type>
<baonthasManufaturer> "wulianchuangan"</baont:hasManufaturer>
<baonthasSerialNumber> 123456789</baont:hasSerialNumber>
<baont:hasFunctionality> tempContainer</baont:hasFunctionality>
<baont:hasFunctionality> humidityContainer</baont:hasFunctionality>
</baont:sensor12>
</rdf:RDF>

In the foregoing information <baont:sensor12> indicates that a name of a resource described by the semantic description resource is sensor12, <rdf: type>Humiture Sensor</rdf: type> is triplet information of semantic information sensor12 is a type of HumitureSensor (humiture sensor), <baont:hasManufaturer>"wulianchuangan"</baont:hasManufaturer> is triplet information of semantic information a manufacturer of sensor12 is wulianchuangan, <baont:hasSerialNumber>123456789</baont:hasSerialNumber> is triplet information of semantic information a sequence number of sensor12 is 123456789, <baont:hasFunctionality> tempContainer </baont:hasFunctionality> is triplet information of semantic information a function provided by sensor12 is tempContainer, and <baont: hasFunctionality>humidityContainer</baont: hasFunctionality> is triplet information of semantic information a function provided by sensor12 is humidityContainer.

Figure 3B:
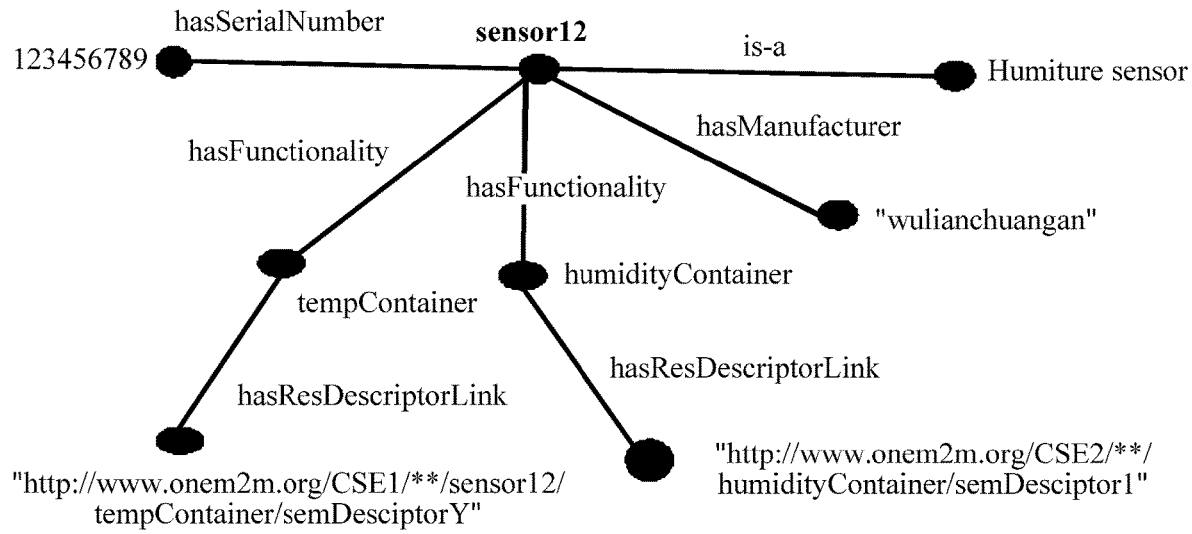
FIG. 3B is a schematic diagram of a triplet that indicates semantic information and an association relationship and that is included in a description attribute parameter of a semantic description resource associated with another semantic description resource according to an embodiment of the present disclosure.

FIG. 3B is a schematic diagram of a triplet that indicates semantic information and an association relationship and that is included in a description attribute parameter of a semantic description resource associated with another semantic description resource according to an embodiment of the present disclosure. Further, in FIG. 3B, a semantic description resource SemanticDescriptorX created for a resource sensor12 includes the triplet information indicating the semantic information in FIG. 3A, and further includes triplet information indicating an association relationship: tempContainer hasResDescriptorLink http://www.onem2m.org/CSE1//sensor12/tempContainer/semDesciptorY, and triplet information indicating an association relationship humidityContainer hasResDescriptorLink http://www.onem2m.org/CSE2//humidityContainer/semDesciptor1. In the foregoing information, the triplet information tempContainer hasResDescriptorLink http://www.onem2m.org/CSE1//sensor12/tempContainer/semDesciptor indicating the association relationship indicates that tempContainer is associated with a semantic description resource whose URI is http://www.onem2m.org/CSE1//sensor12/tempContainer/semDesciptorY, that is, tempContainer is a resource described by the semantic description resource whose URI is http://www.onem2m.org/CSE1//sensor12/tempContainer/semDesciptorY, and the triplet information humidityContainer hasResDescriptorLink http://www.onem2m.org/CSE2//humidityContainer/semDesciptor1 indicating the association relationship indicates that humidityContainer is associated with a semantic description resource whose URI is http://www.onem2m.org/CSE2//humidityContainer/semDesciptor1, that is, humidityContainer is a resource described by the semantic description resource whose URI is http://www.onem2m.org/CSE2//humidityContainer/semDesciptor1.

Figure 3C:
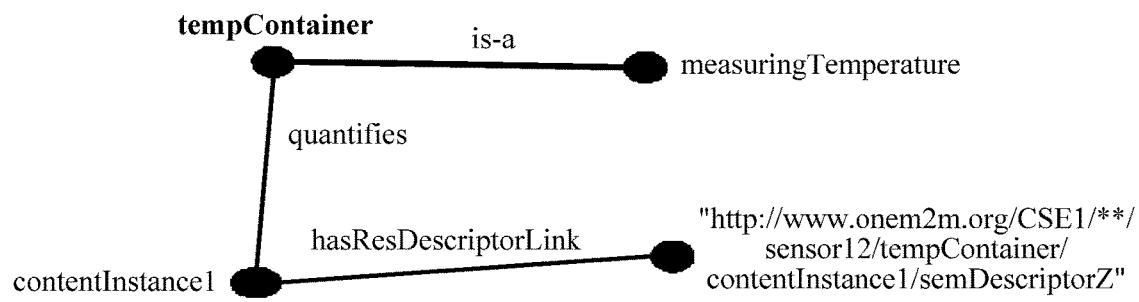
FIG. 3C is a schematic diagram of a triplet that indicates semantic information and an association relationship and that is included in a description attribute parameter of a semantic description resource SemanticDescriptorY associated with a semantic description resource SemanticDescriptorX according to an embodiment of the present disclosure.

Further, FIG. 3C is a schematic diagram of a triplet that indicates semantic information and an association relationship and that is included in a description attribute parameter of a semantic description resource SemanticDescriptorY associated with a semantic description resource SemanticDescriptorX according to an embodiment of the present disclosure. Further, the following triplet information is included a triplet tempContainer rdf:type measuringTemperature indicating semantic information indicates that tempContainer is a type of measuringTemperature (temperature measurement), a triplet tempContainer quantifies contentInstance1 indicating semantic information indicates that tempContainer measures a quantity of contentInstance1, and a triplet contentInstance1 hasResDescriptorLink http://www.onem2m.org/CSE1//sensor12/tempContainer/contentInstance1/semDesciptorZ indicating an association relationship indicates that contentInstance1 is associated with a semantic description resource whose URI is http://www.onem2m.org/CSE1//sensor12/tempContainer/contentInstance1/semDesciptorZ, that is, contentInstance1 is a resource described by the semantic description resource whose URI is http://www.onem2m.org/CSE1/**/sensor12/tempContainer/contentInstance1/semDesciptorZ.

Figure 3D:
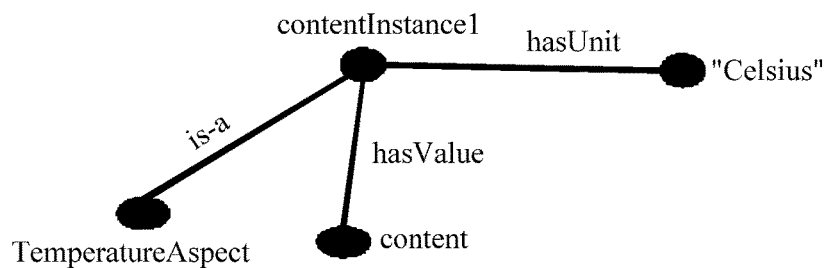
FIG. 3D is a schematic diagram of a triplet that indicates semantic information and that is included in a description attribute parameter of a semantic description resource SemanticDescriptorZ associated with a semantic description resource SemanticDescriptorY according to an embodiment of the present disclosure.

FIG. 3D is a schematic diagram of a triplet that indicates semantic information and that is included in a description attribute parameter of a semantic description resource SemanticDescriptorZ associated with a semantic description resource SemanticDescriptorY according to an embodiment of the present disclosure. Further, the following triplet information is included contentInstance1 rdf:type TemperatureAspect indicates that contentInstance1 is a type of TemperatureAspect (temperature aspect), contentInstance1 hasUnit Celsius indicates that a unit of contentInstance1 is Celsius (degree Celsius), and contentInstance1 hasValue content indicates that a value of contentInstance1 is content (content in content).

Figure 4:
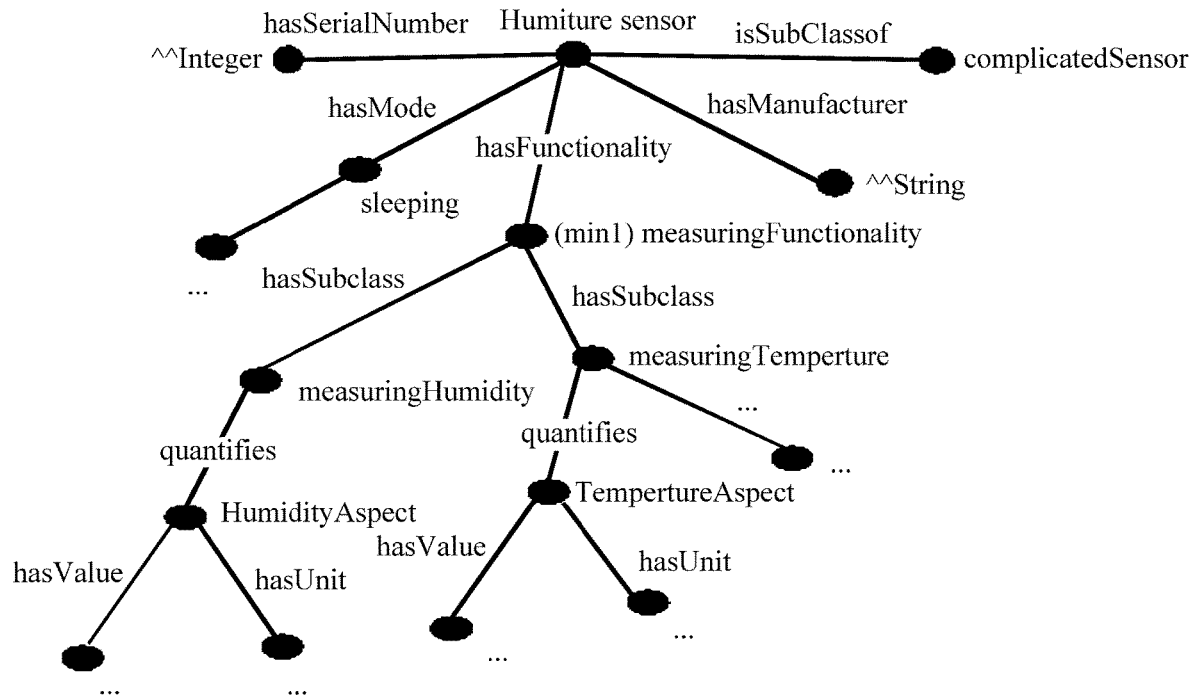
FIG. 4 is a schematic diagram of a triplet of content of a HumitureSensor class-related ontology part in an ontology baseOntology according to an embodiment of the present disclosure.

FIG. 4 is a schematic diagram of a triplet of content of a HumitureSensor class-related ontology part in an ontology baseOntology according to an embodiment of the present disclosure. This type of ontology exists on a platform in a form of a triplet and includes HumitureSensor hasSerialNumuber. ^^Integer, indicating that a HumitureSensor (humiture sensor) class has a sequence number ^^Integer, where a value of ^^Integer is an integer, HumitureSensor hasManufacturer ^^string, indicating that a manufacturer of HumitureSensor (humiture sensor) is ^^ string, where a value of ^^ string is a character string, HumitureSensor hasFunctionality min1 measuringFunctionality, indicating that Humiture Sensor (humiture sensor) has at least one measuringFunctionality (measurement function), HumitureSensor hasMode sleeping, indicating that HumitureSensor (humiture sensor) has a sleeping (sleeping) mode, HumitureSensor isSubClassof complicatedSensor, indicating that HumitureSensor (humiture sensor) is a subclass of complicatedSensor (complex sensor), measuringFunctionality hasSubclass measuringTemperture, indicating that measuringFunctionality (measurement function) has a subclass of measuringTemperture (temperature measurement), measuringFunctionality hasSubclass measuringHumidity, indicating that measuringFunctionality (measurement function) has a subclass of measuringHumidity (humidity measurement), measuringTemperture quantifies TemperatureAspect, indicating that measuringTemperture measures a quantity of temperatureAspect (temperature aspect), and measuringHumidity quantifies HumidityAspect, indicating that measuringHumidity measures a quantity of HumidityAspect (humidity aspect).

Figure 5:
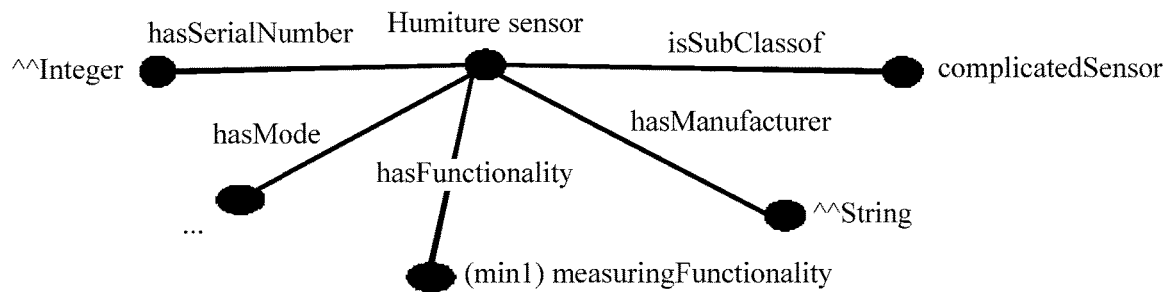
FIG. 5 is a schematic diagram of a triplet of a Humiture Sensor-related ontology whose depth is 1 according to an embodiment of the present disclosure.

In an example, other triplet information included in the ontology in FIG. 4 is not shown one by one herein again. Further, the request message may further indicate a depth h of a semantic triplet of an ontology that needs to be obtained. The depth h may be equal to a maximum depth h1 from the root of a triplet of semantic information in the description attribute of the semantic description resource to all end nodes, or may be another numerical value not less than the maximum depth h1, for example, a multiple of the maximum depth h1 or the maximum depth h1 plus a numerical value. This is not limited in the present disclosure, and the description is provided only using the maximum depth. A calculation method of the depth h is described using the semantic description resource sensor12 provided in step 1 as an example. Depths from the root node sensor12 to end nodes are all 1. Therefore, depths of triplets of this part are h=1. In this case, if a request message optionally carries the semantic triplet depth h=1 of the semantic description resource, the platform only needs to return, from an ontology, HumitureSensor class-associated ontology content whose depth is less than and equal to 1. Using the ontology in FIG. 4 as an example, the HumitureSensor class-associated ontology content whose depth is less than and equal to 1 is shown in FIG. 5, including HumitureSensor hasSerialNumuber. ^^Integer, indicating that a HumitureSensor (humiture sensor) class has a sequence number ^^Integer, where a value of ^^Integer is an integer, HumitureSensor hasManufacturer ^^string, indicating that a manufacturer of HumitureSensor (humiture sensor) is ^^string, where a value of ^^string is a character string, HumitureSensor hasFunctionality min1 measuringFunctionality, indicating that HumitureSensor (humiture sensor) has at least one measuringFunctionality (measurement function), HumitureSensor hasMode sleeping, indicating that HumitureSensor (humiture sensor) has a sleeping (sleeping) mode, and HumitureSensor isSubClassof complicatedSensor, indicating that HumitureSensor (humiture sensor) is a subclass of complicatedSensor (complex sensor).

With reference to the semantic description resource and the ontology referenced by the semantic description resource in FIG. 2 to FIG. 5, FIG. 6 is a flowchart of a semantic validation method according to an embodiment of the present disclosure. The method includes the following steps.

Step 301: A gateway receives a request that is sent by an application server and that is for creating a semantic description resource.

The request message for creating the semantic description resource includes a name of the semantic description resource, semantic information of the semantic description resource, and a URI of an ontology referenced by the semantic description resource. Further, the request for creating the semantic description resource may further include a resource described by the semantic description resource.

In an example, a semantic description resource whose name is semanticDescriptorX is used for describing a resource sensor12 (http://www.onem2m.org/CSE1//sensor12) on a gateway device (a device on which a CSE1 is located), and a value of a parameter of an ontology (ontologyRef) referenced by the semantic description resource is a URI of the referenced ontology, that is, a value of ontologyRef is http://www.onem2m.org//**/baseOntology/HumitureSensor, a name of the semantic description resource is semanticDescriptorX, and a parameter of a description attribute (descriptor) of the semantic description resource includes semantic information. The semantic information includes at least one piece of triplet information, to describe semantics of a resource described by the semantic description resource. For the semantic information of the semantic description resource in this embodiment, refer to triplet information corresponding to the structure shown in FIG. 3A.

It needs to be further described that, the request message may further carry a semantic validation identifier to indicate that semantic validation needs to be performed on the to-be-created semantic description resource. The present disclosure targets only a case in which the semantic validation needs to be performed on the to-be-created semantic description resource. Therefore, in a subsequent embodiment, semantic validation needs to be performed on a semantic description resource by default, and the semantic validation identifier is not particularly stated again.

Step 302: The gateway determines that the to-be-created semantic description resource is not associated with a semantic description resource.

Further, an association relationship between a semantic description resource and another semantic description resource may be implemented in a manner of adding an association attribute to the semantic description resource, where a value of the association attribute is a URI address of the associated another semantic description resource, or may be implemented by adding a piece of triplet information that indicates the association relationship to a description attribute of the semantic description resource, where a subject of the triplet is the semantic description resource, a predicate indicates the association relationship (for example, the predicate includes Link), and an object is the URI address of the associated another semantic description resource, or may be implemented in a manner that can associate two semantic description resources. This is not limited in the present disclosure.

Therefore, determining, by the gateway, that the to-be-created semantic description resource is not associated with a semantic description resource may include determining that the to-be-created semantic description resource does not include an association attribute that indicates an association relationship between the to-be-created semantic description resource and another semantic description resource, and determining that a description attribute of the to-be-created semantic description resource does not include triplet information that indicates the association relationship between the to-be-created semantic description resource and the other semantic description resource.

It should be noted that, in an association relationship between a semantic description resource and another semantic description resource, the other semantic description resource associated with the semantic description resource may be referred to as an associated semantic description resource for short.

It needs to be further noted that, the request message should further carry a requester identifier, and before performing step 302, the gateway may further need to determine whether the requester has permission to create a semantic description resource. An operation of checking the permission is based on other approaches, and is unrelated to the present disclosure. Therefore, in a subsequent embodiment, it is by default that the requester has corresponding permission to operate the semantic description resource. Special descriptions are not provided again.

Step 303: The gateway sends an ontology obtaining request message to a platform.

The ontology obtaining request message carries a value of an attribute of an ontology (ontologyRef) referenced by the semantic description resource. That is, the ontology obtaining request message carries a URI of the ontology referenced by the semantic description resource.

In an example, when a value of the attribute of the referenced ontology (ontologyRef) in the request for creating a semantic description resource is a URI such as http://www.onem2m.org///baseOntology of an ontology resource oneM2M, it indicates that a complete ontology baseOntology needs to be obtained. Optionally, when the carried value of the attribute of the referenced ontology (ontologyRef) is a part of an ontology resource, such as Humiture Sensor, it indicates that a HumitureSensor class-related ontology part in an ontology baseOntology needs to be obtained.

Further, when a destination address URI of the ontology obtaining request points to a part (such as http://www.onem2m.org///baseOntology/Humiture Sensor) of the ontology, the ontology obtaining request may further carry a semantic triplet depth h (for example, 1) of the semantic description resource, indicating that the platform only needs to return ontology information at the specified depth. For related information about the semantic triplet depth h, refer to the descriptions in FIG. 4 and FIG. 5, and details are not described again in this embodiment of the present disclosure.

Step 304: The platform returns a response message, where the response message carries an ontology requested by the gateway.

If a value that is of the URI of the ontology referenced by the semantic description resource and that is carried in the ontology obtaining request in step 303 is the URI such as http://www.onem2m.org///baseOntology, the response message carries complete baseOntologyontology of the ontology resource oneM2M. If a value that is of the URI of the ontology referenced by the semantic description resource and that is carried in the ontology obtaining request in step 303 is a part of an ontology resource, such as HumitureSensor, the response message carries the HumitureSensor class-related ontology part shown in FIG. 4. Further, if the ontology obtaining request in step 303 further carries a parameter indication depth h=1, the response message carries the HumitureSensor class-related ontology part whose depth is 1 shown in FIG. 5, that is, the response message carries the ontology part shown in FIG. 5.

In this embodiment, the response message carries the ontology part shown in FIG. 5.

Step 305: The gateway performs semantic validation, and creates the semantic description resource after the semantic validation succeeds.

Further, the gateway performs the semantic validation on the semantic information (that is, a semantic triplet in FIG. 3A) of the to-be-created semantic description resource based on the obtained ontology referenced by the semantic description resource (such as the content in FIG. 5), and creates, after the semantic validation succeeds, the semantic description resource based on the request for creating the semantic description resource.

It should be noted that, performing semantic validation on semantic information and creating a semantic description resource are based on the other approaches. For how the gateway performs the semantic validation, details are not described in this embodiment of the present disclosure.

Step 306: The gateway returns a semantic description resource creation success response message to the application server.

In another example, in step 301, the request for creating the semantic description resource may alternatively be a request for updating the semantic description resource. After receiving the request for updating the semantic description resource, the gateway performs steps 302 and 303. After receiving the response message returned by the platform, the gateway performs step 305, updates the semantic description resource after the validation succeeds, and returns an update success response message in step 306.

In an optional implementation, the gateway may further set a semantic validation (semanticValidated) identifier in the semantic description resource. In addition, in step 305, after the semantic validation succeeds, the gateway sets the semantic validation identifier to a parameter indicating that the semantic validation succeeds, and adds the parameter indicating that the semantic validation succeeds to the response message in step 306. In another optional implementation, after performing step 303 (that is, sending the ontology obtaining request to the platform), due to timeout or another reason, the gateway may temporarily fail to obtain the requested ontology resource to perform the semantic validation. Alternatively, the gateway may directly create a semantic description resource instead of performing the semantic validation, and set the semantic validation identifier in the semantic description resource to a parameter (semanticValidated=false) indicating that no semantic validation is performed, to indicate that the semantic validation is not completed.

Figure 6:
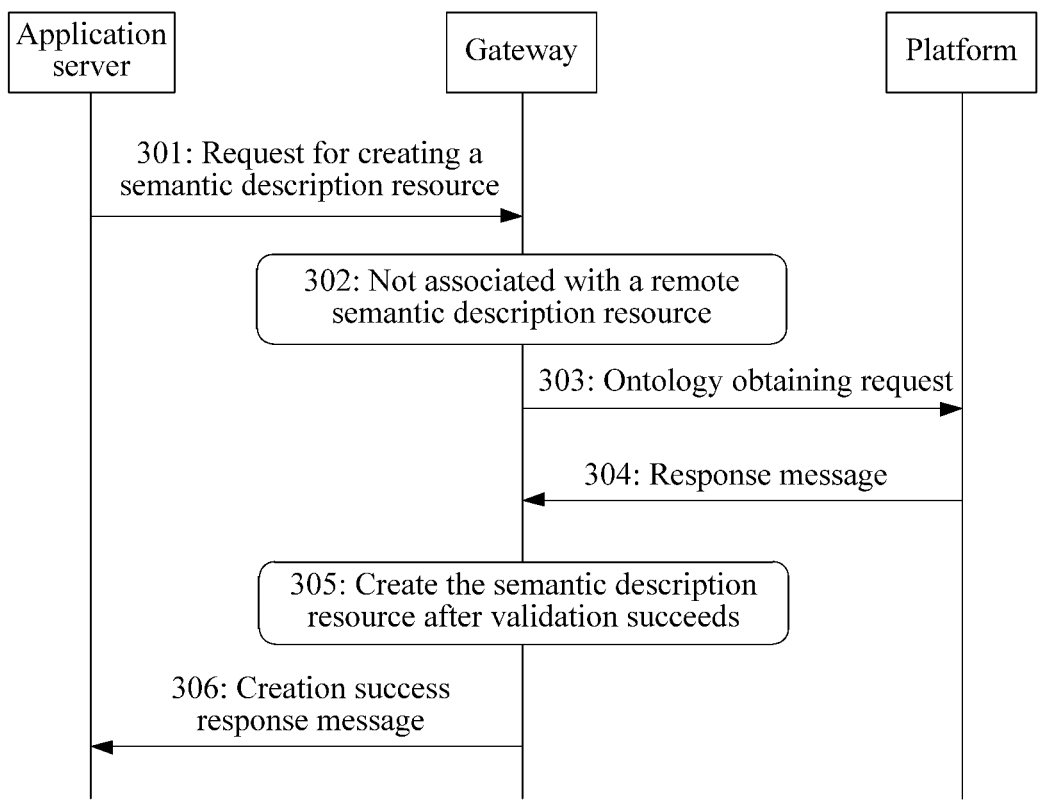
FIG. 6 is a method flowchart of a semantic validation method according to an embodiment of the present disclosure.

It can be learned from the embodiment corresponding to the flowchart shown in FIG. 6 that, in this embodiment of the present disclosure, although the gateway that creates the semantic description resource does not store the ontology for validating the semantic description resource, after determining that the to-be-created semantic description resource is not associated with a remote semantic description resource, the gateway may obtain, from the platform, the ontology referenced by the to-be-created semantic description resource, and validate the to-be-created semantic description resource based on the obtained ontology, and then create the semantic description resource after the validation succeeds. Therefore, in an M2M architecture, when the to-be-created semantic description resource and the ontology are located on different devices, the semantic description resource can still be created and validated. Therefore, it is ensured that a semantic description resource stored on each device provides correct description information for a resource described by the semantic description resource, and the description information is consistent with and has no conflict with an ontology referenced by the semantic description resource and another semantic description resource associated with the semantic description resource.

Figure 7:
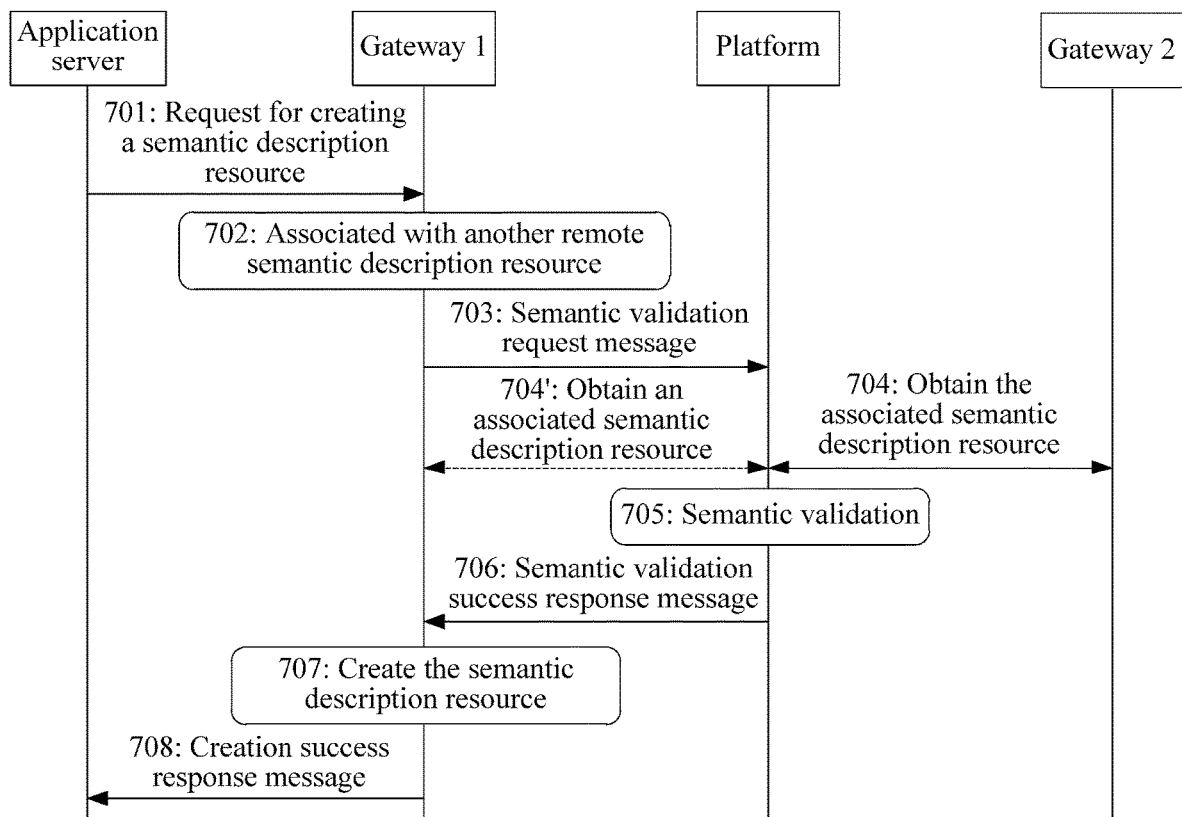
FIG. 7 is a method flowchart of a semantic validation method according to an embodiment of the present disclosure.

FIG. 7 is a flowchart of another semantic validation method according to an embodiment of the present disclosure. The method includes the following steps.

Step 701: A gateway 1 receives a request that is sent by an application server and that is for creating a semantic description resource.

Further, for the request for creating the semantic description resource in step 701, refer to the descriptions in step 301.

In addition, a description attribute of the semantic description resource in this step may further include information indicating that the to-be-created semantic description resource is associated with another semantic description resource.

In an example, for triplet information included in the description attribute of the semantic description resource in this step, refer to the descriptions of FIG. 3B.

Step 702: The gateway 1 determines that the to-be-created semantic description resource is associated with a semantic description resource.

Further, for an association relationship between the semantic description resource and the other semantic description resource, refer to the description in step 302, and details are not described again in this step.

Therefore, determining, by the gateway based on the association relationship between the semantic description resource and the other semantic description resource, that the to-be-created semantic description resource is associated with the semantic description resource may be further determining, by the gateway, that the to-be-created semantic description resource includes an association attribute that indicates the association relationship, and determining, by the gateway, that a description attribute of the to-be-created semantic description resource includes triplet information that indicates the association relationship.

The triplet information that indicates the association relationship includes a URI of the to-be-created semantic description resource, a predicate that indicates an association, and a URI of the associated semantic description resource. Information about the attribute that indicates the association relationship includes a parameter indicating the association attribute, and the URI of the associated semantic description resource that is used as a value of the parameter indicating the association attribute.

In an example, the URI of the associated semantic description resource in the association attribute or the URI of the associated semantic description resource in the URIs in the triplet information that indicates the association relationship may be http://www.onem2m.org/CSE2//humidityContainer/semDescriptor1 in FIG. 3B. Therefore, an associated semantic description resource semDescriptor1 is located in a CSE2**.

Step 703: The gateway 1 sends a semantic validation request message to a platform, where the semantic validation request message carries a name of the to-be-created semantic description resource, semantic information of the semantic description resource, a URI of an ontology referenced by the semantic description resource, and a URI of the associated semantic description resource.

In addition, the semantic validation request message uses a semantic validation parameter to indicate to the platform that the request message is a semantic validation request message. Further, an implementation of the semantic validation parameter may be that a destination URI to which the validation request message sends is a URI of a semantic validation resource, or may be that a semantic validation parameter is added to a destination URI to which the validation request message sends.

In an example, the platform creates and stores a semantic validation resource to indicate that all request messages sent to the semantic validation resource are semantic validation request messages. Therefore, when receiving a request message whose destination address is a URI of the semantic validation resource, the platform confirms to perform semantic validation. In another example, when a destination URI of a semantic validation request message sent by a gateway 1 to the platform is not the URI of the semantic validation resource, and may be a URI of an ontology or another URI, but the destination URI includes the semantic validation parameter (such as semanticValidate), the platform may confirm, based on the semantic validation parameter in the destination URI, to perform semantic validation.

In this embodiment of the present disclosure, the semantic information of the semantic description resource, and the association relationship that includes the URI of the associated semantic description resource that are carried in the semantic validation request message in step 703 are shown in FIG. 3B.

Step 704: The platform obtains the associated semantic description resource from a gateway 2.

Further, the associated semantic description resource is a semantic description resource associated with the created semantic description resource. The platform determines, based on the URI (such as URI:http://www.onem2m.org/CSE2/\*\*/humidityContainer/semDescriptor1 of the associated semantic description resource included in the triplet information of the association relationship in FIG. 3B) of the associated semantic description resource in the association relationship, a gateway (such as a gateway on which the CSE2 is located, that is, the gateway 2) on which the semantic description resource associated with the created semantic description resource is located, and sends a semantic description resource obtaining request message to the gateway on which the associated semantic description resource is located. The semantic description resource obtaining request message carries the URI of the associated semantic description resource. The gateway 2 returns the associated semantic description resource to the platform based on the URI of the associated semantic description resource.

In an example, the URI of the associated semantic description resource that is included in the association relationship and that is carried in the validation request message is http://www.onem2m.org/CSE2/\*\*/humidityContainer/semDescriptor1. The platform sends, based on the URI, the semantic description resource obtaining request message to the gateway (that is, the gateway 2) on which the CSE2 is located. The semantic description resource obtaining request message carries http://www.onem2m.org/CSE2/\*\*/humidityContainer/semDescriptor1, and then the platform receives, from the gateway 2, a semantic description resource semDescriptor1 indicated by http://www.onem2m.org/CSE2/\*\*/humidityContainer/semDescriptor1.

Further, if the created semantic description resource in step 701 includes a plurality of association relationships, there is a plurality of URIs of associated semantic description resources, indicating that the created semantic description resource is associated with a plurality of semantic description resources. Then, the semantic validation request message in step 703 carries the URIs of all the associated semantic description resources. In step 704, the platform separately obtains the associated semantic description resource based on the URIs of all the associated semantic description resources.

In this embodiment, the triplet information in FIG. 3B includes two association relationships. An associated semantic description resource in one of the association relationships is stored on the gateway on which a CSE1 is located, and a URI of the associated semantic description resource is URI:http://www.onem2m.org/CSE1/\*\*/sensor12/tempContainer/semDescriptorY. An associated semantic description resource in the other association relationship is stored on the gateway on which the CSE2 is located, and a URI of the associated semantic description resource is URI:http://www.onem2m.org/CSE2/\*\*/humidityContainer/semDescriptor1. Therefore, besides obtaining the associated semantic description resource from the gateway 2, the platform further needs to obtain the associated semantic description resource from the gateway 1.

Step 704': The platform obtains an associated semantic description resource from a gateway 1.

Further, the associated semantic description resource is another semantic description resource associated with the to-be-created semantic description resource. The platform determines, based on the URI (such as http://www.onem2m.org/CSE1/\*\*/sensor12/tempContainer/semDesciptor) of the associated semantic description resource, a gateway (such as the gateway on which CSE1 is located, that is, the gateway 1) on which the semantic description resource associated with the created semantic description resource is located, and sends a semantic description resource obtaining request message to the gateway on which the associated semantic description resource is located. The semantic description resource obtaining request message carries the URI of the associated semantic description resource. The gateway 1 returns the associated semantic description resource to the platform based on the URI of the associated semantic description resource.

It should be noted that, step 704' is an optional step. Step 704' may be replaced with another optimized solution, when the semantic description resource associated with the created semantic description resource and the created semantic description resource are located on a same gateway or device, the semantic validation request message in step 703 may further carry a local semantic description resource (such as a semantic description resource indicated by http://www.onem2m.org/CSE1/\*\*/sensor12/tempContainer/semDesciptor in this step) associated with the created semantic description resource.

Step 705: The platform performs semantic validation on the semantic description resource.

Further, the platform separately performs semantic validation on semantic information of the created semantic description resource and semantic information of the associated semantic description resource using an ontology referenced by the to-be-created semantic description resource and an ontology referenced by the associated semantic description resource.

It is assumed that content in a parameter of a description attribute of a semantic description child resource semDesciptorX of the resource sensor12 in FIG. 2 is shown in FIG. 3B. Because semDesciptorX is associated with a semantic description child resource semDesciptorY of a resource temContainer, triplet information in the resource semDesciptorY needs to be merged with triplet information in the resource semDesciptorX. Further, because semDesciptorY is associated with a semantic description resource semDesciptorZ of a resource contentInstance1, the triplet information in the resource semDesciptorY is merged with triplet information in the resource semDesciptorZ. Same processing is performed on a semantic description child resource semDesciptor1 of humidityContainer associated with semDesciptorX, and it is assumed that the triplet information in semDesciptorX is consistent with both triplet information in the semantic description child resource semDesciptor1 and triplet information in a semantic description resource associated with semDesciptor1. Therefore, special details are not subsequently described.

Herein, it is assumed that ontologies referenced by all semantic description resources are http://www.onem2m.org///baseOntology (FIG. 4 shows a part of the ontology). An existing semantic validation tool may directly perform, using the ontology, semantic validation on complete semantic description triplet information after an association is complete. Assuming that in this embodiment, it is validated using the ontology in FIG. 4 that the triplet information in FIG. 3B, the triplet information in FIG. 3C, and the triplet information in FIG. 3D are consistent, it indicates that the newly created semantic description resource semDesciptorX is not only consistent with the ontology, but also consistent with the associated semDesciptorY and semDesciptorZ.

Only for describing a case in which an inconsistency may occur, herein it is assumed that the other semantic description resource semDesciptor1 associated with semDesciptorX includes the following triplet information, humidityContainer rdf:type controllingFunction, indicating that humidityContainer is of a type of controllingFunction (control function).

In addition, it is assumed that the ontology further includes the following triplet information, controllingFunction isdisjointwith measuringFunctionality, indicating that measuringFunctionality (measurement function) and controllingFunction (control function) do not overlap.

Obviously, when performing semantic validation on the complete semantic description triplet information after the association is complete, the existing semantic validation tool obtains a conclusion of inconsistency. It may be obtained from the triplet information in semDesciptor1 that, humidityContainer is the type of the controllingFunction (control function), but it may be obtained from the triplet information in semDesciptorX and the triplet information in the ontology that humidityContainer is the type of the measuringFunction (measurement function). However, it is defined in the ontology that measuringFunctionality (measurement function) and controllingFunction (control function) do not overlap. Therefore, the to-be-created semantic description resource semDesciptorX is inconsistent with the associated semantic description resource semDesciptor1.

Further, if the associated semantic description resource obtained by the platform includes a parameter indicating that no semantic validation is performed, the platform needs to first validate the semantic information of the obtained associated semantic description resource based on the URI of the ontology referenced by the obtained associated semantic description resource, and then separately perform semantic validation on the semantic information of the created semantic description resource and semantic information of an associated remote semantic description resource using the ontology referenced by the to-be-created semantic description resource and an ontology referenced by the associated remote semantic description resource.

Step 706: The platform sends a semantic validation success response message to the gateway 1.

Step 707: After receiving the semantic validation success response message sent by the platform, the gateway 1 creates the semantic description resource based on the request for creating the semantic description resource in step 701.

Step 708: The gateway 1 returns a semantic description resource creation success response message to the application server.

It can be learned from the foregoing examples that, after determining that a semantic description resource is associated with another semantic description resource, the gateway triggers an M2M platform to perform, using the stored ontology, semantic validation on the semantic description resource and the associated semantic description resource that are stored on an M2M gateway. Compared with the procedure in FIG. 6, in this solution, because a semantic description resource that needs to be validated is associated with another semantic description resource, validation needs to be performed on both the associated semantic description resource and the semantic description resource that needs to be validated. In this solution, the gateway does not need to perform semantic validation after obtaining an ontology referenced by a semantic description resource on the gateway, obtaining an ontology referenced by an associated semantic description resource, and obtaining the associated semantic description resource. Therefore, an operation by the gateway can be simplified, and procedure complexity can be reduced. In an optional implementation, if in a process of steps 703 to 706, the gateway 1 does not receive the semantic validation success response message in step 706 due to various reasons of the platform, for example, the platform does not obtain the associated semantic description resource, or the semantic validation does not succeed, or a network fault occurs during interaction between the gateway 1 and the platform in step 703 or 706, the gateway 1 may not need to perform step 707, that is, may not create the semantic description resource and returns a semantic description resource creation failure response message to the application server. Because only a semantic description resource on which semantic validation succeeds is created, it is ensured that all created semantic description resources are successfully validated, to facilitate subsequent application server learning and referencing.

In another optional implementation, the gateway 1 may further set a semantic validation (semanticValidated) identifier in the created semantic description resource. In addition, in step 305, after the semantic validation succeeds, the gateway sets the semantic validation identifier to a parameter (semanticValidated=true) indicating that the semantic validation succeeds, and adds the parameter indicating that the semantic validation succeeds to the response message in step 708. In this case, if in a process of steps 703 to 706, the gateway 1 does not receive the semantic validation success response message in step 706 due to various reasons of the platform, for example, the platform does not obtain the associated semantic description resource, or a network fault occurs during interaction between the gateway 1 and the platform in step 703 or 706, the gateway may first perform step 707, that is, create the semantic description resource, set the semantic validation identifier to a parameter (semanticValidated=false) indicating that no semantic validation is performed, and add the parameter indicating that no semantic validation is performed to the response message in step 708. The parameter indicating that the semantic validation succeeds or the parameter indicating that no semantic validation is performed is added to the semantic description resource such that an application server or another apparatus that subsequently obtains or accesses the semantic description resource can clearly determine whether the semantic validation has been performed, and whether a resource described by the semantic description resource can be learned and referenced.

In another optional implementation, in FIG. 6 and FIG. 7, the request for creating the semantic description resource may alternatively be a request for updating the semantic description resource. After receiving the request for updating the semantic description resource, the gateway performs a subsequent procedure of FIG. 6 or FIG. 7 based on related information of the request for updating the semantic description resource. In addition, in FIG. 6 or FIG. 7, a step of creating the semantic description resource is a step of updating the semantic description resource, and a step of returning the creation success response is a step of returning an update response. Details are not described again in this embodiment of the present disclosure. In this embodiment of the present disclosure, both the request for creating the semantic description resource and the request for updating the semantic description resource may be referred to as operation requests related to the semantic description resource, and both the creation of the semantic description resource and the updating of the semantic description resource may be referred to as operations related to the semantic description resource.

In another optional implementation, the gateway may further receive a semantic description resource obtaining request sent by the application server, where the obtaining request carries a URI of a to-be-obtained semantic description resource. After receiving the semantic description resource obtaining request sent by the application server, if determining, based on the URI of the to-be-obtained semantic description resource, that semantic validation on the to-be-obtained semantic description resource succeeds, the gateway directly returns the semantic description resource to the application server. Determining, by the gateway, that semantic validation on the to-be-obtained semantic description resource succeeds includes that the to-be-obtained semantic description resource includes the parameter indicating that the semantic validation succeeds or the to-be-obtained semantic description resource does not include the parameter indicating that no semantic validation is performed. Further, the obtaining request may further carry a semantic validation identifier to instruct to obtain the to-be-obtained semantic description resource on which the semantic validation succeeds.

If the gateway determines, based on the URI of the to-be-obtained semantic description resource, that the to-be-obtained semantic description resource includes the parameter indicating that no semantic validation is performed, the gateway further needs to trigger to perform semantic validation on semantic information of the to-be-obtained semantic description resource. Triggering to perform semantic validation on semantic information of the to-be-obtained semantic description resource is further that the gateway and the platform further need to perform validation on the semantic information of the semantic description resource in step 302 to step 305 in FIG. 6, or perform steps 702 to 706 in FIG. 7, and then send the successfully validated semantic description resource to the application server. In another optional implementation, if the gateway determines that the semantic validation has not been performed on the to-be-obtained semantic description resource, the gateway may alternatively directly return the semantic description resource to the application server, and indicate that the semantic validation has not been performed on the returned semantic description resource.

Further, the semantic description resource obtaining request may further include the parameter (such as semanticValidated=true) indicating that the semantic validation succeeds. The gateway sends, to the application server based on the parameter indicating that the semantic validation succeeds in the request for obtaining the semantic description resource, the semantic description resource that includes the parameter indicating that the semantic validation succeeds and the semantic description resource that does not include the parameter (such as semanticValidated=false) indicating that no semantic validation is performed. That is, the gateway returns only a semantic description resource on which semantic validation succeeds to the application server, to ensure accuracy of application server learning and referencing.

Figure 8:
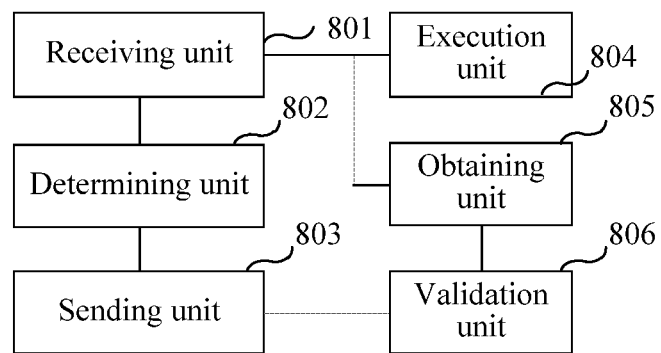
FIG. 8 is a schematic structural diagram of an apparatus that stores a semantic description resource.

As shown in FIG. 8, an embodiment of the present disclosure further provides a schematic structural diagram of an apparatus that stores a semantic description resource. The apparatus 800 includes a receiving unit 801, a determining unit 802, a sending unit 803, an execution unit 804, an obtaining unit 805, and a validation unit 806. The receiving unit 801 is configured to receive an operation request related to a first semantic description resource, where the operation request related to the first semantic description resource includes semantic information of the first semantic description resource, an association relationship between the first semantic description resource and another semantic description resource, and a URI of an ontology referenced by the first semantic description resource, the determining unit 802 is configured to determine, based on the association relationship between the first semantic description resource and the other semantic description resource, a semantic description resource associated with the first semantic description resource, and the sending unit 803 is configured to send, based on the URI of the ontology referenced by the first semantic description resource, a semantic validation request message to an apparatus that stores the ontology referenced by the first semantic description resource, where the semantic validation request message includes the semantic information of the first semantic description resource, the URI of the ontology referenced by the first semantic description resource, and a URI of the associated semantic description resource indicated by the association relationship, and the semantic validation request message is used for instructing to perform semantic validation on the semantic information of the first semantic description resource and semantic information of the associated semantic description resource using the ontology indicated by the URI of the ontology referenced by the first semantic description resource and an ontology referenced by the associated semantic description resource.

Further, the receiving unit 801 is further configured to perform a step such as step 301, 304, 701, 704, 704', or 706 performed by the gateway in FIG. 6 and FIG. 7. The determining unit 802 may further perform steps 302 and 702 performed by the gateway in FIG. 6 and FIG. 7, the execution unit 804 is configured to perform steps 707 and 305 in FIG. 6 and FIG. 7, and the obtaining unit 805 may be further configured to perform steps 303 and 304 in FIG. 6. Details are not described again in this embodiment of the present disclosure. In addition, the apparatus in FIG. 8 may be configured to perform any procedure performed by the gateway in the foregoing method procedures, and store the semantic description resource in FIG. 2 to FIG. 3D.

Further, the apparatus in FIG. 8 is presented in a form of functional units. The "units" herein may refer to an ASIC, a circuit, a processor and a memory for executing one or more software or firmware programs, an integrated logic circuit, and/or another component that can provide the foregoing functions. In a simple embodiment, persons skilled in the art may conceive that the apparatus in FIG. 8 may be in a form shown in FIG. 1B. The units may be implemented using the processor and the memory in FIG. 1B.

Figure 9:
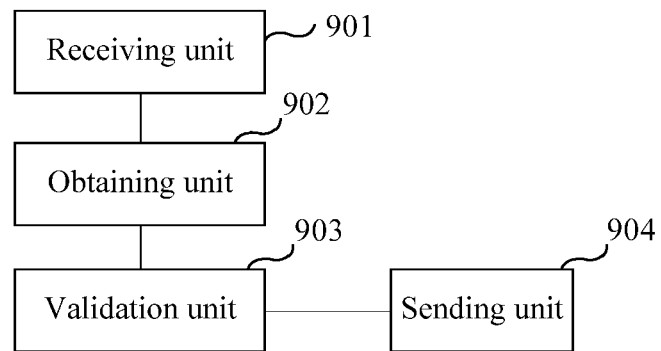
FIG. 9 is a schematic structural diagram of an apparatus that stores an ontology referenced by a semantic description resource.

As shown in FIG. 9, an embodiment of the present disclosure further provides a schematic structural diagram of an apparatus that stores an ontology referenced by a semantic description resource. The apparatus is applied to the M2M system, such as an M2M platform. The apparatus includes a receiving unit 901, an obtaining unit 902, a validation unit 903, and a sending unit 904.

The receiving unit 901 is configured to receive a semantic validation request message sent by the apparatus that stores the semantic description resource, where the semantic validation request message includes semantic information of a first semantic description resource, a URI of an ontology referenced by the first semantic description resource, and an association relationship between the first semantic description resource and another semantic description resource, the obtaining unit 902 is configured to obtain, based on the association relationship between the first semantic description resource and the other semantic description resource, semantic information of the associated another semantic description resource and a URI of an ontology referenced by the associated semantic description resource, and the validation unit 903 is configured to perform semantic validation on the semantic information of the first semantic description resource and the semantic information of the associated semantic description resource using the ontology indicated by the URI of the ontology referenced by the first semantic description resource and the ontology indicated by the URI of the ontology referenced by the associated semantic description resource.

Further, the receiving unit 901 is further configured to perform steps such as steps 303 and 703 performed by the platform in FIG. 6 and FIG. 7. The obtaining unit 902 may further perform step 704 performed by the platform in FIG. 6 and FIG. 7, the validation unit 903 is configured to perform step 705 in FIG. 7, and the sending unit 904 may be further configured to perform steps 304 and 706 in FIG. 6 and FIG. 7. Details are not described again in this embodiment of the present disclosure. In addition, the apparatus in FIG. 9 may be configured to perform any procedure performed by the platform in the foregoing method procedures, and store the ontology referenced by the semantic description resource in FIG. 4 and FIG. 5.

Further, the apparatus in FIG. 9 is presented in a form of functional units. The "units" herein may refer to an ASIC, a circuit, a processor and a memory for executing one or more software or firmware programs, an integrated logic circuit, and/or another component that can provide the foregoing functions. In a simple embodiment, persons skilled in the art may conceive that the apparatus in FIG. 9 may be in a form shown in FIG. 1B. The units may be implemented using the processor and the memory in FIG. 1B.

An embodiment of the present disclosure further provides a computer storage medium, to store a computer software instruction used by the apparatus that stores the semantic description resource shown in FIG. 8 or the apparatus that stores the ontology referenced by the semantic description resource shown in FIG. 9. The computer storage medium includes a program designed for performing the foregoing method embodiments. Semantic validation may be performed on a semantic description resource by performing the stored program.

An embodiment of the present disclosure further provides another computer storage medium configured to store computer software instructions used by the foregoing gateway and platform. The computer storage medium includes a program designed for performing the foregoing method embodiments. Semantic validation may be performed on a semantic description resource by performing the stored program. Persons of ordinary skill in the art should understand that all or some subject matters in this application may be implemented in software in combination with hardware and/or firmware. For example, the subject matters described in this specification may be implemented in software executed by one or more processors. In an example of an implementation, the subject matters described in this specification may be implemented using a non-transitory computer readable medium that stores a computer executable instruction. When a processor of a computer executes the computer executable instruction, the instruction controls the computer to perform steps. An example of a computer readable medium applicable to implementation of the subject matters described in this specification includes the non-transitory computer readable medium, such as a magnetic disk storage device, a chip storage device, a programmable logical device, or an application-specific integrated circuit. In addition, the computer readable medium that implements the subject matters described in this specification may be located on a single device or computing platform, or may be distributed on a plurality of devices or computing platforms.

Finally, it should be noted that, the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present disclosure.

What is claimed is:

1. A semantic validation method, implemented by a gateway in a Machine-to-Machine Communications (M2M) system, wherein the method comprises:
  receiving, from an application server, a first request requesting to create a first semantic description resource, wherein the first request comprises first semantic information of the first semantic description resource, an association relationship between the first semantic description resource and a second semantic description resource, and a first uniform resource identifier (URI) of a first ontology referenced by the first semantic description resource, and wherein the gateway does not store the first ontoloy;
  determining the first semantic description resource is associated with the second semantic description resource, based on the association relationship; and
  sending, responsive to the determining, a semantic validation request message to a platform associated with the first URI and storing the first ontology, wherein the semantic validation request message comprises a second URI of the second semantic description resource, the first semantic information, and the first URI, wherein the semantic validation request message instructs the platform to perform semantic validation on the first semantic information using the first ontology, and wherein the semantic validation request message instructs the platform to perform semantic validation on second semantic information of the second semantic description resource using a second ontology referenced by the second semantic description resource.

2. The method of claim 1, further comprising:
receiving a semantic validation success response message from the platform;
creating-the first semantic description resource; and
setting, in the first semantic description resource, a parameter indicating that the semantic validation on the first semantic information succeeds.

3. The method of claim 1, further comprising:
receiving a response message from the platform indicating that no semantic validation is performed;
creating the first semantic description resource; and
setting, in the first semantic description resource, a parameter indicating that no semantic validation is performed.

4. The method of claim 1, wherein the first semantic description resource comprises an association attribute indicating the association relationship.

5. The method of claim , further comprising:
receiving, from a server, a semantic description resource obtaining request carrying a third URI of a to-be-obtained semantic description resource, wherein the to-be-obtained semantic description resource comprises a parameter indicating that no semantic validation has been performed;
triggering to perform semantic validation on third semantic information of the to-be-obtained semantic description resource; and
sending the to-be-obtained semantic description resource to the server.

6. The method of claim 1, further comprising:
receiving a second request requesting to create a third semantic description resource, wherein the second request comprises third semantic information of the third semantic description resource, and a third URI of a third ontology referenced by the third semantic description resource;
determining the third semantic description resource is not associated with the second semantic description resource;
obtaining, based on the third URI , the second ontology from the platform; and
performing validation on the third semantic information using the third ontology.

7. The method of claim 6, further comprising:
determining the validation on the third semantic information succeeds;
creating the third semantic description resources; and
setting, in the third semantic description resource, a parameter indicating that the validation on the third semantic information succeeds.

8. The method of claim 6, wherein the third semantic description resource does not comprise an association attribute, and wherein a description attribute of the third semantic description resource does not comprise triplet information indicating an association relationship between the third semantic description resource and the second semantic description resource.

9. The method of claim 1, further comprising:
receiving a second related requesting to create a third semantic description resource, wherein the second request comprises third semantic information of the third semantic description resource, and a third URI of a third ontology referenced by the third semantic description resource;
determining the third semantic description resource is not associated with the second semantic description resource;
sending, based on the third URI, an ontology obtaining request to the platform;
determining the third ontology is not received;
creating the third semantic description resourcesecond operation request; and
setting, in the third semantic description resource, a parameter indicating that no semantic validation is performed.

10. The method of claim 1, wherein a description attribute of the first semantic description resource comprises triplet information indicating the association relationship.

11. The method of claim 10, further comprising:
receiving, from a server, a semantic description resource obtaining request carrying a third URI of a to-be-obtained semantic description resource, wherein the to-be-obtained semantic description resource comprises a parameter indicating that no semantic validation is performed,
triggering to perform semantic validation on third semantic information of the to-be- obtained semantic description resource; and
sending the to-be-obtained semantic description resource to the server.

12. A semantic validation method, implemented by a platform in a Machine-to-Machine Communications (M2M) system, wherein the method comprises:
receiving, from a gateway, a semantic validation request message, wherein the semantic validation request message comprises first semantic information of a first semantic description resource, a first uniform resource identifier (URI) of a first ontology referenced by the first semantic description resource, and an association relationship between the first semantic description resource and a second semantic description resource;
obtaining, based on the association relationship, second semantic information of the second semantic description resource and a second URI of a second ontology referenced by the second semantic description resource; and
performing semantic validation on the first semantic information and the second semantic information using the first ontology and the second ontology.

13. The method of claim 12, further comprising:
returning a semantic validation success response message to the gateway when the semantic validation succeeds, wherein the semantic validation success response message instructs to set, for the first semantic description resource, a parameter indicating that the semantic validation succeeds; and
returning a response message indicating that no semantic validation is performed to the gateway when the second semantic information and the second URI are not obtained, wherein the response message indicates instructs to set, for the first semantic description resource, a parameter indicating that no semantic validation is performed.

14. The method of claim 12, further comprising:
receiving an ontology obtaining request from the gateway, wherein the ontology obtaining request carries a third URI of a third ontology, wherein the third ontology is used for validating third semantic information of a third semantic description resource stored in the gateway; and returning the third ontology to the gateway.

15. A gateway in a Machine-to-Machine Communications (M2M) system, wherein the gateway comprises:
 a memory configured to store computer executable program code;
 a transceiver coupled to the memory; and
 a processor coupled to the memory and the transceiver, wherein the computer executable program code, when executed by the processor, causes the processor to:
  receive, from an application server using the transceiver, a request to create a first semantic description resource, wherein the request comprises first semantic information of the first semantic description resource, an association relationship between the first semantic description resource and a second semantic description resource, and a first uniform resource identifier (URI) of a first ontology referenced by the first semantic description resource, and wherein the gateway does not store the first ontology;
  determine the first semantic description resource is associated with the second semantic description resource, based on the association relationship; and
  send, responsive to the determining using the transceiver, a semantic validation request message to a platform associated with the first URI and storing the first ontology, wherein the semantic validation request message comprises a second URI of the second semantic description resource, the first semantic information, and the first URI, wherein the semantic validation request message instructs the platform to perform semantic validation on the first semantic information using the first ontology, and wherein the semantic validation request message instructs the platform to perform semantic validation on second semantic information of the second semantic description resource using a second ontology referenced by the second semantic description resource.

16. The gateway of claim 15, wherein the first semantic description resource describes a resource of the gateway.

17. The gateway of claim 15, wherein the computer executable program code further causes the processor to:
 receive a semantic validation success response message from the platform;
 create the first semantic description resource; and
 set, in the first semantic description resource, a parameter indicating that the semantic validation on the first semantic information succeeds.

18. The gateway of claim 15, wherein the computer executable program code further causes the processor to:
 receive a response message from the platform indicating that no semantic validation is performed;
 create the first semantic description resource; and
 set, in the first semantic description resource, a parameter indicating that no semantic validation is performed.

19. The gateway of claim 15, wherein the computer executable program code further causes the processor to:
 receive a second request to create a third semantic description resource, wherein the second request comprises third semantic information of the third semantic description resource, and a third URI of a third ontology referenced by the third semantic description resource;
 determine the third semantic description resource is not associated with the second semantic description resource;
 obtain, based on the third URI, the second ontology from the platform; and
 perform validation on the third semantic information using the third ontology.

20. The gateway of claim 15, wherein the computer executable program code further causes the processor to:
 receive a second request to create a third semantic description resource, wherein the second request comprises third semantic information of the third semantic description resource, and a third URI of a third ontology referenced by the third semantic description resource;
 determine the third semantic description resource is not associated with the second semantic description resource;
 send, based on the third URI, an ontology obtaining request to the platform;
 determine the third ontology is not received;
 create the third semantic description resource; and
 set, in the third semantic description resource, a parameter indicating that no semantic validation is performed.

* * * * *